US006013359A

United States Patent [19]

Takano et al.

[11] Patent Number: 6,013,359

[45] Date of Patent: Jan. 11, 2000

[54] PRINTING PAPER COATED WITH NONIONIC ACRYLAMIDE AND METHOD OF PRODUCING SAME

[75] Inventors: Toshiyuki Takano; Motoi Fukuda; Toshimi Satake, all of Tokyo; Masahide Taniguchi, Hyogo-ken, all of Japan

[73] Assignees: Nippon Paper Industries Co., Ltd., Tokyo; Seiko Chemical Industry Co., Ltd., Hyogo, both of Japan

[21] Appl. No.: 08/766,585

[22] Filed: Dec. 12, 1996

[30] Foreign Application Priority Data

Dec. 12, 1995 [JP] Japan .................................... 7-323082

[51] Int. Cl.[7] ...................................................... B32B 29/06

[52] U.S. Cl. .......................... 428/219; 428/342; 428/507; 428/514; 162/135; 162/164.6; 427/211; 427/361; 427/365; 427/428

[58] Field of Search .................................... 428/219, 340, 428/341, 342, 507, 510, 514; 162/168.3, 164.1, 135; 427/391, 211, 365, 361, 428

[56] References Cited

U.S. PATENT DOCUMENTS

| | | | |
|---|---|---|---|
| 2,945,775 | 7/1960 | Lehman et al. | 162/186.3 |
| 4,966,652 | 10/1990 | Wasser | 162/135 |
| 5,470,918 | 11/1995 | Tsutumi et al. | 525/329.2 |
| 5,698,305 | 12/1997 | Suzuki et al. | 428/219 |
| 5,750,253 | 5/1998 | Satake et al. | 428/342 |
| 5,849,154 | 12/1998 | Takano et al. | 162/135 |

*Primary Examiner*—Paul Thibodeau
*Assistant Examiner*—D. Lawrence Tarazano
*Attorney, Agent, or Firm*—Knobbe, Martens, Olson & Bear, LLP

[57] ABSTRACT

A printing paper, especially a newsprint base paper, comprising: a base paper; and a coating layer for improving surface strength of the coated paper and releasing-property when two sheets of the coated paper are stacked, which coating layer is formed on the base paper by using a coating-transcription system such as a gate roll coating system, which coating layer comprises at least either a homopolymer polyacrylamide or a nonionic-copolymer polyacrylamide in a coating weight of from 0.01 g/m$^2$ to 0.2 g/m$^2$, wherein the homopolymer polytcrylamide and the nonionic-copolymer polyacrylamide have a weight average molecular weight ranging from 20,000 to 250,000, thereby improving not only surface strength but also releasing-property in a printing paper, especially in a newsprint paper having a basis weight less than 46 gm$^2$.

14 Claims, No Drawings

PRINTING PAPER COATED WITH NONIONIC ACRYLAMIDE AND METHOD OF PRODUCING SAME

BACKGROUND

1. Field of the Invention

The present invention relates to printing paper having a coating layer, particularly to newsprint paper having a coating layer, which exhibits improved surface strength and suppressed adhesiveness, and to the manufacturing method thereof.

2. Background of the Art

In general, newsprint paper (paper for printing newspaper, a roll of newsprint) is mainly composed of mechanical pulp and de-inked pulp (hereinafter "de-inked pulp" is referred to as "DIP") and classified into medium-grade paper or low-grade paper. Newsprint paper is, however, required to satisfy quality requirements stricter than those for general printing paper, since a specified number of newspapers must be printed in a specified duration of time in a specified time zone, with certainty in newspaper printing. Newsprint paper is special paper from such a viewpoint, thus a special classification is applied to it. In addition, since a reduction in weight, an increase in content of DIP, etc. are further required for newsprint paper, improvement to satisfy all these needs is required. Thus, improvement of newsprint paper requires a much higher level of technology as compared with that of general printing paper.

Recently, in the field of printing technology for newspapers, transition from relief printing to off-set printing has rapidly proceeded together with the introduction of computer systems into printing of newspapers, in order to respond to the necessity of an increase in printing speed, coloring of the paper, various kinds of printing, and automation, for example.

Newsprint paper used for off-set printing is required to have different qualities from those used for relief printing. These quality requirements include that (1) paper should have wet strength and not suffer from water break; (2) paper should retain adequate water absorptivity; and (3) paper should have surface strength. Among these quality requirements, improvement on surface strength, which involves resolving paper powder problems, is a particularly critical target. Under such circumstances, similar properties are desirable for general printing paper.

In printing paper, especially in newsprint paper, recent trends other than an increase in surface strength, a reduction in weight and an increase in content of DIP, etc. are also sought.

As for a reduction in weight of newsprint paper, for example, in Japan, paper with a basis weight of 46 g/m$^2$ accounted for 96% of newsprint paper in 1989, but paper with a basis weight of 43 g/m$^2$ has come to account for as high as approximately 80% in 1993. With progress towards a reduction in the weight of paper, problems such as a decrease in opaqueness of newsprint paper and a reduction in paper strength, etc. have arisen, and increases in amounts of fillers and pigments are required to cope with these problems. However, the increases in amounts of these components together with a tendency of newsprint paper itself towards being thinner and lighter cause the phenomenon that the added components are easily released from the surface of paper. In particular, when off-set printing that requires paper moistening be used, the fiber network of the paper becomes loosened upon moistening, resulting in an increase in the release if fillers and pigments. This problem becomes more serious as reduction in paper weight is progressed. For example, improvement of paper with a basis weight lower than 46 g/m$^2$ is a more difficult problem to be solved than that of paper with a basis weight of 46 g/m$^2$ or higher.

At the same time, an increase in DIP content caused increases in amounts of components such as microfiber fillers, and pigments derived from DIP, which in turn cause problems such as dropping of paper powder and a decrease in paper strength. These problems also become more serious as the composition ratio of DIP increases.

In any event, recent trends in newsprint paper work as serious disadvantageous factors, especially wit respect to surface strength.

There are roughly two means known to improve the surface strength of newsprint paper, those not using coating operation and those using coating operation.

The means not using coating operation comprises alteration of raw material composition, alteration of paper manufacturing conditions, and an increase in amounts of paper strength-reinforcing agents. However, it is difficult to comply with strict quality requirements for newsprint paper used for off-set printing by only relying on such means.

On the other hand, the coating means are effective in improving surface strength, because it is a method of coating-surface treatment agents such as starch, modified starch (oxidized starch, starch derivatives, etc.), and polyvinyl alcohol (abbreviated as "PVA" hereinafter) on the surface of newsprint paper (external addition). Application of external addition of agents is also considered for general printing paper.

For economic reasons, on-machine coating has been generally employed for coating surface treatment agents onto the surface of newsprint paper. In particular, a gate roll coater using a coating formation and transcription system, which enables high-speed coating, has commonly been used. Characteristics of the gate roller coating method are simply summarized in, for example, Japan TAPPI Journal 43 (4), p. 36, 1989 and Paper Pulp Technology Times Vol. 36, No. 12, p. 20, 1993. This method enables coating liquid to be retained on the surface of paper and is thus more effective for improvement of paper surface, as compared with a conventional two-roll size press method. In the two-roll size press method, since base paper passes through a pond (liquid pool) of coating liquid, the base paper is impregnated very deeply with the coating liquid. In contrast, in the gate roll coating method, since coating liquid forms a film in advance, which is then transcribed to the surface of base paper, the base paper is not substantially impregnated with the coating liquid. Thus, in the gate roll coating method, coating material tends to remain on the surface of base paper and efficient improvement of paper surface can be achieved.

However, as described above, recent trends in newsprint paper, i.e., reduction in paper weight and an increase in content of DIP, are highly negative factors with respect to surface strength, and therefore, the coating weight of surface treatment agents need to be increased. When surface treatment agents such is starch groups and PVA are used in high amounts, problems due to their adhesiveness (which is called "Neppari") are caused in manufacturing or printing of newsprint paper, since the agents exhibit adhesiveness when moistened with water. This adhesion problem is more pronounced and serious when the gate roll coating method is employed for coating than when the two-roll size press method is employed.

Thus, properties of not only improving surface strength but also reducing adhesiveness of coated paper, i.e., good releasing-property of coated paper, are required essentially for surface treatment agents used for newsprint paper.

As described above, a single coating of starch, modified starch, or PVA is in fact effective in improving surface strength to a certain extent when the coating weight is increased. When the coating weight is increased, adhesiveness of the coated paper increases and releasing-property suffers.

Adhesion-preventing agents, which are added to surface treatment agents and improve releasing-property, are disclosed in Japanese Patent Application Laid-open No. 6-57688 (1994) and No. 6-192995 (1994), for example. That is, adhesion-preventing agents comprising organic fluoro compounds are disclosed in Japanese Patent Application Laid-open No. 6-57688, and adhesion-preventing agents containing substituted succinic acid and/or substituted succinic acid derivatives as effective components disclosed in Japanese Patent Application Laid-open No. 6-192995. These adhesion-preventing agents are useful agents in increasing the coating weight of surface treatment agents. However, the use of these adhesion-preventing agents cause drawbacks such as (1) bubbling of coating material is noticeable when applied on the surface, most likely because a coating material is composed of two component bases, surface treatment agents and adhesion-preventing agents; and (2) the cost tends to go up.

Sizing agents for paper are disclosed in the Japanese Patent Application Laid-open Nos. 5-59689 and 5-295693, for example. Particularly in Japanese Patent Application Laid-open No. 7-119078, disclosed is a composition composed of PVA and block copolymer of ethylenoxide and propyleneoxide, which is applied on newsprint paper, resulting in that the newsprint paper has low adhesiveness during off-set printing and has an improved surface strength. The composition allows for improvement of releasing-property to a certain degree, as compared with a single use of starch-based material or PVA. However, when reduction in weight and an increase in content of DIP progress further, it is impossible to exhibit satisfactory surface strength and releasing-property.

Many surface treatment agents using PAM (polyacrylamide) are suggested in, for example, Japanese Patent Publication No. 40-24926 (1965), Japanese Patent Laid-open No. 59-163498 (1984), 3-199489 (1991), 5-163697 (1993), 6-65893 (1994), 6-65894 (1994), 6-157679 (1994), and 6-179728 (1994). In Japanese Patent Publication No. 40-24926, disclosed is a reaction product composed of PAM (or anionic PAM) and polyhydric aldehyde. In Japanese Patent Laid-open NO. 59-163498, disclosed is a composition composed of anionic PAM having an average molecular weight ranging from 10,000 to 500,000 and PAM modified by the Mannish reaction having an average molecular weight ranging from 10,000 to 500,000. In Japanese Patent Laid-open No. 3-199489, disclosed is a vessel pick-preventing agent composed of a low-molecular polymer of acrylamide having an average molecular weight of 100,000 or lower and a high-molecular polymer of acrylamide having an average molecular weight of 400,000 or higher. In Japanese Patent Laid-open No. 5-163697, disclosed is a surface treatment agent composed of a (meth) acrylamide copolymer having an average molecular weight ranging from 50,000 to 1,000,000 and a (meth)acrylamide copolymer having an average molecular weight ranging from 2,000,000 to 20,000,000. In Japanese Patent Laid-open Nos. 6-65893, 6-65894, 6-157679, and 6-179728, disclosed are PAM copolymers composed of three to five types of monomers. Particularly in Japanese Patent Laid-open Nos.

6-157679 and 6-179728, it is taught that PAM copolymers having a molecular weight ranging from 800,000 to 2,500,000 are preferred.

However, these PAMs disclosed above are anionic PAMs, cationic PAMs, or amphoteric PAMs, all of which are ionic to a certain degree. Further, in the above references, releasing-property of coated paper, which is highly required for gate roll coating methods, is not considered. Therefore, even if the surface treatment agents are applied to newsprint base paper having a basis weight of 46 g/m$^2$ or less, releasing-property of coated paper ("neppari") is not sufficient, although surface strength is improved.

In Japanese Patent Laid-open No. 60-59193, disclosed is a surface-protecting layer-forming agent composed of a copolymer (anionic PAM) of (meth)acrylamide ("(meth) acrylamide" denotes "acrylamide and/or methacrylamide" hereinafter), acrylic acid or its derivatives, and vinyl monomer, to which copolymer a crosslinking agent is added. However, this surface-protecting layer-forming agent is applied onto a coating layer of thermal-sensitive recording paper, i.e., it is not designed for improving the surface of paper itself.

Further, in Japanese Patent Laid-open No. 1-186372 (1989), disclosed is an ink-jet-recording paper containing nonionic or cationic PAM having an average molecular weight ranging from 10,000 to 500,000. However, as with the above, this technology is not for improving surface strength of paper, and PAM functions as a binder for fixing synthetic amorphus sillic that forms an ink-receiving layer.

In addition, as an example of PAM used in newsprint paper, Japanese Patent Laid-open No. 55-36315 (1979) discloses newsprint paper in which amphoteric PAM (Mannich reaction products of anionic PAM) is used as an internal additive.

However, in the reference, the amphoteric PAM is used as an internal additive for the sake of paper strength, and is essentially different from material aimed at improving paper strength in gate roll coating methods. Further, even if this amphoteric PAM is added externally, releasing-property of coated paper ("neppari") remains problematic.

Under the above circumstances, what has been sought is surface treatment agents which improve not only surface strength but also mitigate adhesiveness, i.e., improve releasing-property, in paper, especially lightweight newsprint paper having a basis weight less than 46 g/m$^2$.

SUMMARY OF THE INVENTION

The present invention has exploited a printing paper, especially a lightweight newsprint paper, having improved not only surface strength but also releasing-property. An objective of the present invention is to supply surface treatment agents suitable for base paper, especially lightweight newsprint base puaper having a basis weight less than 46 g/m$^2$, and another objective of the present invention is to supply paper such as lightweight newsprint paper, especially newsprint paper suitable for off-set printing, on which surface treatment agents are applied, which paper has good and well balanced surface strength and releasing-property.

The above objectives are achieved by the present invention. Namely, an important aspect of the present invention is a printing paper, especially a newsprint base paper, comprising: (1) a base paper; and (2) a coating layer formed on said base paper by using a coating-transcription system such as a gate roll coating system, for improving surface strength of the coated paper and releasing-property when two sheets of the coated paper are stacked, said coating layer comprising at least either a homopolymer-based polyacrylamide or a nonionic-copolymer-based polyacrylamide in an effective amount, said homopolymer-based polyacrylamide and said nonionic-copolymer-based polyacrylamide having a weight average molecular weight ranging from 20,000 to 250,000, preferably ranging from 30,000 to 100,000. The coating weight of the above polyacrylamide(s) is preferably in the range of from 0.01 g/m$^2$ to 0.2 g/m$^2$ per one side of said base paper. According to the present invention, not only surface strength but also releasing-property of a printing paper, especially a paper having a basis weight less than 46 g/m$^2$, are significantly improved. That is, the effects are prominent when the present invention is applied to a lightweight printing paper. In the above, said at least either a homopolymer-based polyacrylamide or a nonionic-copolymer-based polyacrylamide, which has amide structures, is substantially nonionic excepting when a part of said amide structures is present in the form of the amidinium structure.

Another important aspect of the present invention is a method for producing a printing paper, comprising: applying to one side or both sides of a base paper by using a coating-transcription system, a coating solution comprising at least either a homopolymer-based polyacrylamide or a nonionic-copolymer-based polyacrylamide to form a coating layer on said base paper for improving surface strength of the coated paper and releasing-property when two sheets of the coated paper are stacked, said homopolymer-based polyacrylamide and said nonionwic-copolymer-based polyacrylamide having a weight average molecular weight ranging from 20,000 to 250,000. In the above, preferable aspects can be the same as in the aforesaid printing paper itself. In the present invention, "polyacrylamide" is abbreviated as "PAM" hereinafter.

As described above, in the present invention, paper having excellent surface strength and releasing-property, which are well balanced with each other, can be obtained by applying to base paper, especially to newsprint base paper, homopolymer-based PAM and/or nonionic-copolymer-based PAM having a weight average molecular weight in a particular range, especially at a coating weight ranging from 0.01 g/m$^2$ to 0.2 g/m$^2$, by using a gate roll coater.

Since the homopolymer-based PAM and nonionic-copolymer-based PAM used in a surface treatment agent in the present invention have low molecular weights, their viscosities are relatively low. Thus, handling is easy, and it is possible to increase their concentration in a coating solution, leading to reduction in transportation costs and satisfaction of economic interests.

The PAM used in the present invention can satisfy both surface strength and releasing-property when simply used as a sole component in a surface treatment agent. In the above, as compared with conventional two-component-based surface treatment agents, other advantages such as 1) low cost, and 2) little bubbling during coating operation can also be exhibited.

In addition, it is possible to obtain a surface treatment agent having further improved releasing-property but having slightly inferior bubbling-preventing property, by using the homopolymer-based PAM and/or the nonionic-copolymer-based PAM of the present invention as an active base polymer or polymers in the surface treatment agent to which other releasing-components are added. Further, in combination with sizing-property-providing material, strength-improving material, and the like, it is possible to obtain newsprint paper having target characteristics.

The paper, especially newsprint paper, of the present invention resolves problems caused by adhesiveness and insufficient surface strength at off-set printing, and thus, the paper is very suitable for off-set printing.

In Japanese Patent Laid-open No. 4-329177 (1992), disclosed is paper for continuous recording characterized in that anionic PAM (the molecular weight range of 3,000–100,000) is applied to the surface of pH-neutral parer. However, this reference does not lead to the base paper, especially newsprint base paper, coated by a gate roll coater of the present invention, because 1) the examples disclosed in the reference relate only to size press operation, and 2) pH-neutral paper disclosed in this reference cationized starch, and thus, ionic effects between the starch and anionic PAM can be expected to a certain degree, while no ionic effects between the starch and PAM of the present invention are expected since the PAM very weakly bears ions or does not bear ions.

Further, regarding the relationship between the molecular weight of PAM when used as an external additive and its effects when applied on the surface of paper, it has been empirically recognized in the art that PAM having a sufficient molecular weight is required for improving surface strength since "the higher the molecular weight of PAM, the greater the effect of improving surface strength becomes."

For example, regarding coating agents for a gate roll coater, Harima Technical News No. 43, p 17 (1995) reported that, by increasing the molecular weight of a PAM-base coating material four to five times that of conventional material (a molecular weight of 400,000–500,000), 1) efficiency of strengthening polymer is improved, and 2) penetration into paper is decreased.

In contrast, the present inventors found that, in gate roll coating methods applied to newsprint paper having a basis weight less than 46 g/m$^2$, when homocopolymer-based PAM or nonionic-copolymer-based PAM is used, it is possible to sufficiently improve surface strength, and that adhesiveness of paper coated by a gate roll coater is low. Accordingly, the present invention has been completed.

DETAILED DESCRIPTION OF THE PREFERRED EMBODIMENTS

Nonionic Polyacrylamide

PAM is a typical synthetic aqueous polymer, and briefly described in "Kami to Kakou no Yakuhin Jiten (Chemicals Dictionary for Paper and. Process)" (p. 241, Tech Times 1991). In the paper manufacturing industry, PAM is widely used as yield-improving agents, filtration-improving agents, dried paper strength-reinforcing agents, and so forth.

However, unmodified PAM itself (a copolymer of polyacrylamide and acrylamide) is not used in the paper manufacturing industry, since unmodified PAM is only slightly ionic. Anionic PAM and amphoteric PAM (or cationic PAM) are therefore used. Anionic PAM includes, for example, PAM whose amide group is partially hydrolyzed and a copolymer of PAM monomer and (meth)acrylic acid ("(meth)acrylic acid" denotes "acrylic acid and/or methacrylic acid" hereinafter). As yield-improving agents or freeness-improving agents, high molecular weight anionic PAM (the molecular weight is approximately 800,000–1,000,000, foir example) is used. As dried paper strength-reinforcing agents, relatively low molecular weight anionic PAM (the molecular weight is approximately 50,000–700,000, for example) is used. Amphoteric PAM (or cationic PAM) includes, for example, PAM modified by the Mannich reaction, PAM degraded by the Hoffman degradation reaction, and a copolymer of PAM monomer and cationic monomer (dimethylaminoethyl(meth)acrylate, diacryldimethylammoniumchloride, or the like).

Weight Average Molecular Weight

As described above, regarding the relationship between the molecular weight of PAM when used as an external additive and the effects when applied on the surface of paper, it has been empirically recognized in the art that the higher the molecular weight of PAM, the greater the effect in improving surface strength becomes. For example, the aforesaid Harima Technical News reported that a molecular weight of 400,000–500,000 was effective.

In contrast, in the present invention, in gate roll coating methods applied to newsprint paper having a basis weight less than 46 g/$m^2$, when homocopolymer-based PAM or nonionic-copolymer-based PAM is used, it is possible to sufficiently improve surface strength, and that adhesiveness of paper coated by a gate roll coater is low.

That is, the present invention relates to paper, especially lightweight base paper such as newsprint base paper having a basis weight less than 46 g/$m^2$, having a gate roll coating layer comprising a homopolymer-based PAM having a weight average molecular weight ranging from 20,000 to 250,000, and/or a nonionic-copolymer-based PAM having a weight average molecular weight ranging from 20,000 to 250,000.

Surface treatment agents usable in the present invention are a homopolymer-based PAM having a weight average molecular weight ranging from 20,000 to 250,000, a nonionic-copolymer-based PAM having a weight average molecular weight ranging from 20,000 to 250,000, or a mixture of both. In any event, one PAM alone or a mixture of two or more PAMs can be employed. When the weight average molecular weight of PAM used in the present invention is more than 250,000, releasing-property suffers, i.e., neppari strength (adhesion strength) is high, resulting in that neppari problems tend to easily occur. On the other hand, when the weight average molecular weight of PAM used in the present invention is less than 20,000, the effects in improving surface strength are not satisfactory when in the amount of a coating described later. With regard to releasing-property, the lower the molecular weight of PAM, the better the releasing-property becomes, and when the weight average molecular weight is 50,000 or less, adhesiveness is negligible in neppari tests described later. On the other hand, for improving surface strength, as described above, the higher the molecular weight of PAM, the higher the effect becomes, i.e., the relationship is opposite to the relationship between the releasing-property and the molecular weight. Thus, in the present invention, the weight average molecular weight ranging from 30,000 to 100,000 is further preferred in view of not only releasing-property but also surface strength.

Homopolymer-Based PAM

Homopolymer-based PAM used in a surface treatment agent of the present invention is a homopolymer obtained by polymerizing acrylamide-base monomers alone, and it is nonionic or weakly cationic. Polyacrylamide itself (homopolymer of acrylamides) is considered to be essentially nonionic. However, polyacrylamide itself has an amide structure, a part of which exists in the form of the amidinium structure (—$CONH_3^+$); thus they may be slightly cationic. Therefore, although in principle, homopolymer-based PAM used in the present invention is defined as being nonionic, it can be weakly cationic from the above point of view, i.e., homopolymer-based PAM is practically or essentially nonionic but may not be absolutely nonionic due to the presence of the amidinium structure. An acrylamide- base monomer usable in the present invention includes, for example, acrylamide; alkylacrylamide such as methacrylamide; and N-alkyl substituted (or N,N-dialkyl substituted) acrylamide such as N-methylacrylamide, N,N-dimethylacrylamide, N-ethylacrylamide, N,N-diethylacrylamide, and N-isoproprylamide. Among these monomers, acrylamide is most preferable. Thus, as homopolymer-based PAM used in the present invention, a homopolymer of acrylamide, i.e., polyacrylamide itself is most preferable.

Nonionic-Copolymer-Based PAM

Nonionic-copolymer-based PAM can also be used in surface treatment agents in the present invention. In this regard, as with homopolymer-based PAM, the nonionic-copolymer-based PAM includes copolymer-based PAMs which are weakly cationic due to the aforesaid amide structure present in the form of the amidinium structure. The nonionic-copolymer-based PAM used in the present invention includes a copolymer obtained by copolymerizing two or more of the aforesaid acrylamide-base monomers, i.e., an acrylamide-base copolymer. For example, a copolymer of acrylamide and methacrylamide, a copolymer of acrylamide and N-methylacrylamide, a copolymer of acrylamide and N,N-dimethylacrylamide, and a copolymer of acrylamide, methacrylamide, and N-ethylacrylamide are included.

In addition, the nonionic-copolymer-based PAM used in the present invention can be PAM obtained by introducing a small amount of nonionic units into polymer chains of the aforesaid homopolymer of acrylamide or copolymer of acrylamides, wherein the amount is such that no adverse effect is exhibited. This copolymer-based PAM can be produced by, for example, copolymerizing acrylamide-base monomers and unsaturated nonionic monomers copolymerizable with the acrlamide monomers. For example, unsaturated nonionic monomers include hydrocarbon-base monomers such as ethylene, α-olefine, isobutylene, butadiene, isoprcne, and styrene; (meth)acrylic acid esters such as methyl(meth)acrylate, and ocutyl(rneth)acrylate; polar monomers such as vinyl ether, vinyl chloride, acrylonitrile, and mnethyl(meth)acrylate.

Other Components of Surface-Treatment Agent

As for surface treatment agents of the present invention, a homopolymer of acrylamide and a copolymer of acrylamide and methacrylamide ire preferably used; particularly a homopolymer of acrylamide, i.e., polyacrylamide itself is most preferably used.

Thus, one of the preferable embodiments of the present invention is lightweight base paper, especially lightweight newsprint base paper, having a basis weight less than 46 g/$m^2$, which paper has a gate roll coating layer composed of a surface treatment agent comprising polyacrylamide (a homopolymer of polyacrylamide) having a weight average molecular weight ranging from 20,000 to 250,000.

The surface treatment agents of the present invention basically comprise simply one type of the aforesaid homopolymer-based PAM or nonionic-copolymer-based PAM, thereby exhibiting additional advantages, i.e., suppression of bubbling of coating material during coating operation by a gate roll coater, and good applicability to a gate roll.

The surface treatment agents of the present invention can also comprise two or more types of homopolymer-based PAM and/or nonionic-copolymer-based PAM, as disclosed in Japanese Patent Laid-open Nos. 3-199489 and 5-163697. However, Japanese Patent Laid-open Nos. 3-199489 and 5-163697 disclose high-molecular PAMs, and when high-molecular PAMs having a weight average molecular weight beyond the particular range, i.e., 20,000–250,000, are used, the high-molecular PAMs cause adverse effects on releasing-property of coated paper. Thus., plural numbers of PAM must have a weight average molecular weight in the above range.

In principle, the surface treatment agents of the present invention can be substantially composed of homopolymer-based PAM and/or nonionic-copolymer-based PAM. The use of a surface treatment agent of homopolymer-based PAM and/or nonionic-copolymer-based PAM allows for good releasing-property when used in amounts of a coating in the range described later. However, for the sake of further improvement on releasing-property, a small amount of releasing components can be added in an amount such that adverse effects are not exhibited, e.g., as far as bubbling of coating material during coating operation by a gate roll coater does not interfere with coating operation. Releasing components include the aforesaid adhesion-prevention agents and monoalkenyl succinate disclosed in Japanes;e Patent Laid-open No. 63-58960 (1988). In combination with PAM used in the present invention, especially with homopolymer-based PAM, monoalkenyl succinate containing alkenyl group having 10–16 carbon atoms in the form of sodium salt, potassium salt, or ammonium salt is most preferable for the reasons of 1) minimal bubbling of coating material during coating operation, and 2) no precipitation generated during coating operation. The addition of monoalkenyl succinate is preferably 10% or less by weight based on the weight of PAM used. When the addition is more than 10%, bubbling of coating material during coating operation becomes noticable, i.e., insufficient adaptability to a gate roll coater. Further, the addition range is preferably from 2% to 5% by weight.

In other words, the surface treatment agent of the present invention can essentially consist of homopolymer-based PAM (and/or nonionic-copolymer-based PAM) having a weight average molecular weight ranging from 20,000 to 250,000, and monoalkenyl succinate containing alkenyl group having 10–16 carbon atoms in an amount of 10% by weight or less based on the weight of the PAM. The surface treatment agent can be applied onto newsprint base paper having a basis weight less than 46 $gIm^2$ in an amount described later.

In principle, it is not necessary to use other components such as binders in combination with the surface treatment agents of the present invention. However, in amounts such that no adverse effects occur, e.g., as far as releasing-property suffers, a small amount of such components can be added. Other components such as binders include, for example, starch-based material such as starch, modified starch (ammonium persulfate (APS) modified starch, enzymatically modified starch, etc.), α-starch, oxidized starch, starch derivatives (esterified starch such as acetylated starch, phosphoric esterified starch, etc.; etherified starch such as methylated starch, hydroxyethylated starch, etc.; and crosslinked starch, etc.), and grafted starch; cellulose-base material such as methylcellulose, ethylcellulose, and carboxymethylcellulose; latex such as styrene-butadiene copolymer, styrene-acrylonitrile copolymer, and styrene-butadiene-acrylic ester copolymers; PVAs such as completely saponified PVA, partially saponified PVA, amide-modified PVA, carboxy-modified PVA, and sulfonate-modified PVA; ionic PAMs such as anionic PAM, cationic PAM, and amphoteric PAM; and various resins such as silicone resin, petroleum resin, terpene resin, ketone resin, and coumarone resin. Since starch-based material, PVAs, or ionic PAMs have a tendency towards increasing adhesion strength of moistened paper when coated on paper, special attention should be paid to the amount employed in combination.

The surface treatment agent of the present invention may include additives such as preservatives, anti-foaming agents, UV-preventing agents, fluorescent brighteners, viscosity stabilizers, and discoloration-preventing agents, and fill(ers as far as they do not materially affect the present invention.

Base Paper/Newsprint Base Paper

Although base paper of the present invention is not necessarily restricted to that for newsprint paper, the effects of the present invention are clearly observed in base paper for newsprint paper. Thus, the use of the present invention for newsprint paper is illustrated hereinafter.

Base paper for newsprint paper employed in the present invention is base paper manufactured using mechanical pulp (MP) such as grand pulp (GP), thermo-mechanical pulp (TMP) and semichemical mechanical pulp, and chemical pulp (CP) represented by kraft pulp (KP), and de-inked pulp (DIP) obtained by de-inking used paper containing the above- mentioned pulp, and recycling pulp obtained by disaggragating loss paper generated from a paper manufacturing process, etc. alone or in the form of a mixture thereof in any ratio. The effects of the present invention are exerted especially on base paper manufactured so as to have a basis weight lower than 46 $g/m^2$. For base paper with a basis weight not lower than 46 $g/m^2$, the surface strength appears to be satisfactorily sufficient due to high content of pulp fibers. Further, it may not be necessary for base paper having a basis weight not lower than 46 $g/m^2$ to use abundant fillers or pigments in order to maintain opacity or prevent ink from penetrating through paper. It may also be unnecessary to increase the contents of filler or pigments to compensate for low surface strength. Thus, the use of the surface treatment agent is effective on base paper having a basis weight lower than 46 $g/m^2$.

The composition ratio of DIP in base paper employed in the present invention may be in any range (0–100%), and preferably in a range of 30–70% owing to the recent trend towards increasing the content of DIP.

In the present invention, base paper for newsprint paper may be base paper containing aluminum sulfate, i.e., so-called acid newsprint base paper, or pH-neutral (non-acid) newsprint base paper.

The base paper for newsprint paper in the present invention may contain, as necessary, filler for paper-making such as white carbon, clay, silica, talc, titanium oxide, calcium carbonate, synthetic resins (vinyl chloride resins, polystyrene resins, urea-formalin resins, melamine resins, styrene-butadiene copolymer resins, etc.); paper strength reinforcing agents such as PAM-base polymers, PVA (polyvinyl alcohol)-base polymers, cationized starch, urea-formalin resins, and melamine-formnlin resins; freeness-or yield-improving agents such as salts of acrylamide-aminomethylacrylamide copolymers, cationized starch, polyethyleneimine, polyethylene oxicle, and acrylamide-sodium acrylate copolymers; sizing agents such as reinforced rosin sizing agents (in the form of solution obtained by adding maleic acid anhydride or fumaric acid anhydride to rosin to give partially maleic or fumaric rosin, and completely saponifating the rosin with alkali to give the solution), emulsion-base sizing agents (in the form of aqueous dispersion obtained by dispersing partially maleic or fumaric rosin in water using rosin soap or various surface-activating agent as an emulsifier), synthetic sizing agents (based on petroleum resins obtained by copolymerizing $C_3$–$C_{10}$ distillates derived from naphtha distillate), and reactive sizing agents such as alkylketene dimers (AKD) and alkenyl succinic anhydride (ASA); adjuvants such as aluminum sulfate, water-resisting agents, UV-preventing agents, and discoloration-preventing agents. The base paper needs to have physical properties enabling printing by an off-set printing press, and it is sufficient for base paper if the base paper possesses physical properties such as tensile strength, tear strength, elongation, etc.

Preparation of Coated Printing Paper

The paper of the present invention, especially paper for newsprint paper, can be produced by externally adding a surface treatment agent comprising homopolymer-based PAM and/or nonionic-copolymer-based PAM to one side or both sides of base paper by using a coating transcription-type coater such as a gate roll coater.

The coating weight of the surface treatment agent in the present invention needs to be such that the contents of PAM components (homopolymer-based PAM and/or nonionic-copolymer-based PAM) in the surface treatment agent to be applied is preferably 0.01 g/m$^2$ or more measured as solid portion weight. In principle, the surface treatment agent of the present invention can simply be composed of PAM components. In this regard, considering cases in which other components are incorporated, the coating weight of the surface treatment agent is expressed by the coating weight of PAM components measured as solid portion weight, unless specified otherwise. The coating weight is further preferably in the range of from 0.01 to 0.2 g/m$^2$ measured as the solid weight of PAM components. If the coating weight of PAM components is less than 0.01 g/m$^2$, the PAM components are not likely to contribute to improvement of surface strength due to insufficient amounts. On the other hand, even if the coating weight is more than 0.2 g/m$^2$, the effects on surface strength reach a plateau, which is not economical.

As a coater, coating-transcription-type coaters such as a gate roll coater, a blade rod metalling coater, and the like can be used; most preferably, a gate roll coater is used. In a coating-transcription-type coater, a predetermined amount of coating material is transcribed from an applicator roll to base paper at a given thickness. Thus, the use of a coater of this type is very effective in applying the coating material to the surface of base paper. In the newsprint paper of the present invention, as described above, since the coating weight of PAM components is low, the use of a transcription coater is effective. It is also clear that an on-machine system is preferred from an economic point of view. In the newsprint paper of the present invention, double-sided paper, i.e., both sides of paper are coated, using a gate roll coater, is most preferable.

Namely, the paper such as newsprint paper of the present invention can be produced by externally adding a surface treatment agent comprising homopolymer-based PAM and/or nonionic-copolymer-based PAM to both sides of the aforesaid base paper such as base paper for newsprint paper, using a gate roll coater.

By applying with a gate roll coater a surface treatment agent comprising homopolymer-based PAM having a weight average molecular weight ranging from 20,000 to 250,000 and/or nonionic-copolymer-based PAM having a weight average molecular weight ranging from 20,000 to 250,000, to the surface of base paper having a basis weight less than 46 g/m$^2$, in an amount ranging from 0.01 g/m$^2$ to 0.2 g/m$^2$, lightweight newsprint paper having good surface strength and releasing-property can be obtained. Although the technological reasons for the above (effects have not yet been clearly explicated, the following reasons are assumed:

Heretofore, material for a gate roll coater was mainly designed for improving surface strength, and thus, high-molecular anionic PAM exhibiting highly improved surface strength and low penetration was used. The reasons for that can be analyzed in view of ionic characteristics as well as average molecular weights.

It has been recognized in the art that, regarding ionic characteristics of PAM significant when used as an external additive, ionic PAM such as anionic PAM, cationic PAM, and amphoteric PAM is preferred as an external additive, since it improves in fixing pulp fiber or aluminum sulfate to aluminum atoms or the like, whereby the PAM tends to remain on the surface of paper. However, in view of releasing-property, it appears that the fact that PAM tends to remain on the surface adversely affects releasing-property. In contrast, it appears that the PAM used in the present invention is nonionic or very weakly ionic, thereby exhibiting high penetration into base paper and effectively contributing to releasing-property.

With regard to the average molecular weight of PAM, high-molecular anionic PAM exhibiting highly improved surface strength and low penetration has been used. As with the above, it appears that high-molecular PAM adversely affects releasing-property because it tends to remain on the surface of base paper. In contrast, it appears that the PAM used in the present invention has relatively low molecular weight and high penetration, thereby positively contributing to releasing-property.

Further, in the present invention, since coating operation is conducted using a gate roll coater, penetration of the PAM into base paper remains minimal, although the PAM itself has a tendency to high penetration. As a result, the PAM can remain near the surface of base paper, and surface strength does not suffer.

In any event, it will be advantageous to releasing-property that the PAM penetrates the paper to a certain degree, as compared with the PAM completely remaining on the surface. This may be one of reasons why the particular PAM of the present invention (homopolymer-based PAM and/or nonionic-copolymer-based PAM) is superior in terms of releasing-property. That is, in the present invention, the use of homopolymer-based PAM and/or nonionic-copolymer-based PAM as a surface treatment agent for external addition in combination with gate roll coating operation are very effective in both surface strength and releasing-property.

EXAMPLES

Hereinafter, referring to preparation examples, examples and comparative examples using newsprint paper, the present invention will be described in detail, but it is not limited to these. Parts in the description denote weight parts.

Making Newsprint Base Paper 35 parts of DIP (de-inked pulp), 30 parts of TMP (thermomechanical pulp), 20 parts of GP (grand pulp) and 15 parts of KP (kraft pulp) were mixed and macerated to regulate the freeness at 200. This mixed pulp was manufactured into an unsized and uncalendared newsprint base paper at the rate of 1,000 m/min by using a Bervet former paper machine. This base paper was 43 g/m$^2$ in weight.

Preparation of Surface Treatment Agent

Preparation Examples 1–4 and 8–14

According to conventional methods, acrylamide was subjected to polymerization in an aqueous solution under various conditions in the presence of ammonium persulfate and sodium hydrogensulfite to produce homopolymer-based PAMs having different molecular weights in the form of an aqueous; solution (PAM-1-4 and 8–14).

Preparation Examples 5–6 and 15

According to conventional methods, acrylamide (99 equivalents) and methacrylamide (1 equivalent) were subjected to polymerization in an aqueous solution under various conditions in the presence of ammonium persulfate and sodium hydrogensulfite to produce copolymer-based PAMs having different molecular weights in the form of an aqueous solution (PAM-5–6 and 15).

Preparation Example 7

According to conventional methods, acrylamide (10 equivalents) and methacrylamide (90 equivalents) were subjected to polymerization in an aqueous solution in the presence of ammonium persulfate and sodium hydrogensulfite to produce copolymer-based PAM in the form of an aqueous solution (PAM-7).

Preparation Example 16

According to conventional methods, acrylamide was subjected to polymerization in an aqueous solution in the presence of ammonium persulfate and sodium hydrogensulfite to produce homopolymer of acrylamide in the form of an aqueous solution. This solution was subjected to partial hydrolysis (approximately 10% of the acrylamide structure were hydrolyzed) in a potassium hydroxide aqueous solution at a reaction temperature of 70–80° C. The pH of the resulting solution was then adjusted to 7 using a hydrochloric acid aqueous solution to obtain anionic PAM in the form of an aqueous solution (PAM-16)(weight average molecular weight: 245,000).

Preparation Example 17

According to conventional methods, acrylamide was subjected to polymerization in an aqueous solution in the presence of ammonLum persulfate and sodium hydrogensulfite to produce homopolymer of acrylamide in the form of an aqueous solution. This solution was subjected to partial hydrolysis (approximately 15% of the acrylamide structure were hydrolyzed) in a potassium hydroxide aqueous solution at a reaction temperature of 70–80° C. The pH of the resulting solution was then adjusted to 7 using a hydrochloric acid aqueous solution to obtain anionic PAM in the form of an aqueous solution (PAM-17) (weight average molecular weight: 460,000).

Preparation Example 18

According to conventional methods, acrylamide (90 equivalents) and acrylamidepropylammoumiun chloride (10 equivalents) were subjected to polymerization at 60° C. in an aqueous solution in the presence of ammonium persulfate and sodium hydrogensulfite to produce cationic PAM in the form of an aqueous solution (PAM-18) (weight average molecular weight: 550,000).

The weight average molecular weights (MW) of the resulting various PAMs (PAM-1–18) are listed in Table 1.

TABLE 1

| Pre. Ex. No. | PAM | MW |
|---|---|---|
| 1 | PAM-1 | 35,000 |
| 2 | PAM-2 | 51,000 |
| 3 | PAM-3 | 100,000 |
| 4 | PAM-4 | 170,000 |
| 5 | PAM-5 | 45,000 |
| 6 | PAM-6 | 200,000 |
| 7 | PAM-7 | 240,000 |
| 8 | PAM-8 | 5,000 |
| 9 | PAM-9 | 12,000 |
| 10 | PAM-10 | 380,000 |
| 11 | PAM-11 | 490,000 |
| 12 | PAM-12 | 640,000 |
| 13 | PAM-13 | 750,000 |
| 14 | PAM-14 | 2,410,000 |
| 15 | PAM-15 | 1,100,000 |
| 16 | PAM-16 | 245,000 |
| 17 | PAM-17 | 460,000 |
| 18 | PAM-18 | 550,000 |

Preparing Newsprint Paper

Examples 1–14

The aqueous solutions of homopolymer-based PAMs (PAM-1-PAM-4) having a weight average molecular weight ranging from 20,000 to 250,000 and copolymer-based PAMs (PAM-5-PAM-7) having a weight average molecular weight in the same range were diluted to given concentrations, and the resulting dilted solutions were applied to one side of the aforesaid newsprint base paper as a coating solution by using a gate roll coater. After the application, the resulting newsprint base paper was super-calendared. In the above, bubbling of the coating during gate roll coating operation was negligible.

Comparative Examples 1–9

The aqueous solutions of homopolymer-based PAMs (PAM-8-PAM-14) having a weight average molecular weight falling outside the range of from 20,000 to 250,000 and copolymer-based PAM (PAM-15) having a weight average molecular weight outside the range were diluted to given concentrations, and the resulting diluted solutions were applied to one side of the aforesaid newsprint base paper as a coating solution by using a gate roll coater. After the application, the resulting newsprint base paper was super-calendared to obtain comparative newsprint paper.

Comparative Examples 10–12

The aqueous solutions of anionic PAMs (PAM-16-PAM-17) and cationic PAM (PAM-18) were diluted to given concentrations, and the resulting diluted solutions were applied to one side of the aforesaid newsprint base paper as a coating solution by using a gate roll coater. After the application, the resulting newsprint paper was super-calendared to obtain comparative newsprint paper.

On the newsprint papers of Examples 1–14 and Comparative Examples 1–12, the amount of coating PAM, the surface strength, and neppari strength were measured.

Measuring Amounts of Coating PAMs

Each newsprint paper was cut, placed in a decomposition tube, and allowed to stand for several minutes after adding concentrated sulfuric acid to the decomposition tube. A hydrogen peroxide aqueous solution and a decomposing agent were added to the tube to conduct heat decomposition. The resulting reaction solution was diluted to a given concentration and introduced to a Kjeldahl analyzer to measure the nitrogen content. From the nitrogen content, the solid weight of coating PiAM was calculated.

Measuring Surface Strength

Two types of measuring methods, i.e., measuring printing strength by a Pruefbau printing tester and measuring the FRT (Fiber rising test) were performed and papers with favorable scores in both measured values were judged as "being excellent in surface strength."

Surface Strength A (printing strength by a Pruefbau printing tester):

A deep red ink (Dainippon Ink & Chemical Inc.) was put cn a rubber roller of a Pruefbau printing tester and applied to a newsprint paper (printed area: 4×20 cm) at a printing pressure of 15 $N/m^2$ and printing speed of 6.0 m/sec. The number of rising fibers upon detachment of a rubber roller and newsprint paper during coating operation was counted using a microscope.

A smaller value indicates greater surface strength. With the present invention, papers on which the number of rising fibers is 20 or less are judged as "being excellent in surface strength."

Surface Strength B (FRT):

A 300 mm×35 mm sheet was cut from a newsprint paper in the direction of a machine and the number of fuzzy fibers in a definite area (1 $m^2$) longer than 0.1 mm was determined by using a surface analyzer FIBER 1000 (Fibro system AB).

A smaller value indicates a greater surface strength. With a newsprint paper according to the present invention, papers in which the number of fuzzy fibers per 1 $m^2$ is 30 or less are judged as "being strong in surface strength."

Measuring Neppari Strength (peeling strength)

After cutting two 4×6 cm sheets from a newsprint paper and soaking the coated surface in water at a temperature of 20° C. for 5 sec, both sheets were closely adhered on mutual coated surfaces. Newsprint base papers were overlaid on both outer surfaces, passed between the rollers under a pressure of 50 $kg/cm^2$ and humidified at 25° C. and 60% RH for 24 hours. After a 3×6 cm test piece was prepared, measurement was performed at 30 mm/min tensile speed by a tensile tester.

A higher measured value signifies greater difficulty in peeling (namely, a stronger adhesion). With a newsprint paper according to the present invention, papers whose neppari strength is 25.0 g/3 cm or less were classified as those of "good separability", and further, papers whose neppari strength is 20.0 g/3 cm or less were classified as those of "excellent separability."

The results of the examples and comparative examples are shown in Table 2. In Table 2, with respect to neppari strength, "*0" means no adhesiveness and no adhered sample prepared according to the aforesaid measuring method. "Broken" means that no separation occurred on the adhered surface in separating a sample by a tensile tester but an inter-layer separation phenomenon of the sample itself occurred.

TABLE 2

| No. | PAM | Coating ($g/m^2$) | Surface Strength A (piece) | Surface Strength B (piece) | Neppari (g/3 cm) |
|---|---|---|---|---|---|
| Ex. 1 | PAM-1 | 0.19 | 8 | 18 | *0 |
| Ex. 2 | PAM-2 | 0.18 | 4 | 15 | 14.0 |
| Ex. 3 | PAM-2 | 0.10 | 7 | 17 | 9.0 |
| Ex. 4 | PAM-2 | 0.06 | 30 | 19 | 6.9 |
| Ex. 5 | PAM-3 | 0.26 | 3 | 14 | 23.4 |
| Ex. 6 | PAM-3 | 0.11 | 7 | 18 | 9.4 |
| Ex. 7 | PAM-3 | 0.02 | 43 | 23 | 1.5 |
| Ex. 8 | PAM-4 | 0.19 | 3 | 14 | 16.5 |
| Ex. 9 | PAM-4 | 0.13 | 7 | 16 | 13.8 |
| Ex. 10 | PAM-5 | 0.18 | 6 | 15 | 0.3 |
| Ex. 11 | PAM-6 | 0.12 | 7 | 20 | 12.2 |
| Ex. 12 | PAM-6 | 0.06 | 22 | 24 | 10.1 |
| Ex. 13 | PAM-6 | 0.02 | 40 | 28 | 5.0 |
| Ex. 14 | PAM-7 | 0.08 | 14 | 18 | 10.4 |
| Com. 1 | PAM-8 | 0.25 | 152 | 70 | *0 |
| Com. 2 | PAM-9 | 0.12 | 184 | 83 | *0 |
| Com. 3 | PAM-10 | 0.16 | 8 | 15 | 26.2 |
| Com. 4 | PAM-11 | 0.13 | 8 | 15 | 30.9 |
| Com. 5 | PAM-8 | 0.15 | 4 | 14 | 65.0 |
| Com. 6 | PAM-9 | 0.05 | 23 | 22 | 38.9 |
| Com. 7 | PAM-10 | 0.01 | 212 | 90 | 25.5 |
| Com. 8 | PAM-11 | 0.12 | 2 | 14 | broken |
| Com. 9 | PAM-8 | 0.09 | 13 | 16 | broken |
| Com. 10 | PAM-9 | 0.18 | 12 | 19 | 32.5 |
| Com. 11 | PAM-10 | 0.14 | 10 | 17 | 33.0 |
| Com. 12 | PAM-11 | 0.12 | 9 | 18 | 34.2 |

Surface Strength A: excellent: 50 or less
Surface Strength B: strong: 30 or less
Neppari Strength: good: 25 or less Comparative Example 13

An aqueous solution of oxidized starch (trade name: SK-20, available from Nihon Corn Starch Ltd.) was prepared (solid portion weight ratio was 4%). This aqueous solution was applied as a coating solution to one side of the aforesaid newsprint base paper by using a gate roll coater. After the coating operation, the coated base paper was super-calendared to obtain a newsprint paper of the comparative example. The results of the evaluation tests on this newsprint paper were as follows:

Coating weight: 0.17 $g/m^2$
Surface strength A: 60
Surface strength B: 55
Neppari strength: 20.5 g/3 cm Comparative Example 14

By adding a random copolymer of ethylene oxide and propylene oxide to an aqueous solution of PVA (trade name: K-17, available from Deuki Kagaku Kogyo K.K.) at a ratio of 5 parts of copolymer to 100 parts of PVA, a coating solution was prepared. The obtained coating solution was applied to one side of the aforesaid newsprint base paper by using a gate roll coater. After the coating operation, the coated newsprint base paper was super-calendared to obtain a newsprint paper of the comparative example. The results of the evaluation tests on this newsprint paper were as follows:

Coating weight: 0.20 $g/m^2$
Surface strength A: 39
Surface strength B: 40
Neppari strength: 27.8 g/3 cm Example 15

By adding 3 parts by weight of sodium alkenyl succinate having $C_{10}$–$C_{16}$ (disclosed in Japanese Patent Publication No. 63-58960 (1988)) to 97 parts by weight of an aqueous solution of homopolymer-based PAM (PAM-2, weight average molecular weight: 51,000), a coating solution was obtained. The obtained coating solution was applied to one side of the aforesaid newsprint base paper by using a gate roll coater. After the coating operation, the coated newsprint base paper was super-calendared to obtain a newsprint paper. The results of the evaluation tests on this newsprint paper were as follows:

Coating weight: 0.17 g/m$^2$

Surface strength A: 6

Surface strength B: 18

Neppari strength: 13.0 g/3 cm

In the above, bubbling of coating materials during gate roll coating was slightly detectable, but it did not interfere with the coating operation.

Comparative Example 15

By adding 5 parts by weight of ammonium perfluorooctanate (disclosed in Japanese Patent Laid-open No. 6-57688 (1994)) to 95 parts by weight of an aqueous solution of anionic PAM (PAM-17, weight average molecular weight: 460,000), a coating solution was obtained. The obtained coating solution was applied to one side of the aforesaid newsprint base paper by using a gate roll coater. However, bubbling of the coating solution was intensive and interfered with the coating operation to the extent that it could not be conducted.

Comparative Example 16

By adding 5 parts by weight of octenyl succinic anhydride (disclosed in Japanese Patent Laid-open No. 6-192995 (1994)) to 95 parts by weight of an aqueous solution of anionic PAM (PAM-17, weight average molecular weight: 460,000), a coating solution was obtained. The obtained coating solution was applied to one side of the aforesaid newsprint base paper by using a gate roll coater. However, bubbling of the coating solution was intensive and interfered with the coating operation to the extent that it could not be conducted.

Example 16

By mixing 70 parts by weight of homopolymer-based PAM (PAM-2, weight average molecular weight: 51,000) and 30 parts by weight of copolymer-based PAM (PAM-5, weight average molecular weight: 45,000), a coating solution was obtained. The obtained coating solution was applied to one side of the aforesaid newsprint base paper by using a gate roll coater. After the coating operation, the coated newsprint base paper was super-calendared to obtain a newsprint paper. The results of the evaluation tests on this newsprint paper were as follows:

Coating weight: 0.11 g/m$^2$

Surface strength A: 6

Surface strength B: 17

Neppari strength: 8.1 g/3 cm

Comparative Example 17

By mixing 70 parts by weight of anionic PAM (obtained by partial alkaline hydrolysis of PAM-2 at a hydrolysis rate of 10%) having a weight average molecular weight less than 100,000 and 30 parts by weight of anionic PAM (obtained by partial alkaline hydrolysis of PAM-12 at a hydrolysis rate of 10%) having a weight average molecular weight of 400,000 or higher, a coating solution was obtained. The obtained coating solution was applied to one side of the aforesaid newsprint base paper by using a gate roll coater. After the coating operation, the coated newsprint base paper was super-calendared to obtain a newsprint paper of the comparative example. The results of the evaluation tests on this newsprint paper were as follows:

Coating weight: 0.11 g/m$^2$

Surface strength A: 11

Surface strength B: 18

Neppari strength: 37.0 g/3 cm

Comparative Example 18

By reacting anionic PAM (PAM-17, weight average molecular weight: 460,000) with formaldehyde and dimethyl amine to a Mannish reaction product of anionic PAM containing 10% of a Mannish base, a reaction product was obtained. The resulting reaction product was diluted to a given concentration to obtain a coating solution. The obtained coating solution was applied to one side of the aforesaid newsprint base paper by using a gate roll coater. After the coatting operation, the coated newsprint base paper was super-calendared to obtain a newsprint paper of the comparative example. The results of the evaluation tests on this newsprint paper were as follows:

Coating weight: 0.12 g/m$^2$

Surface strength A: 16

Surface strength B: 22

Neppari strength: 45.1 g/3 cm

In will be understood by those of skill in the art that numerous various and modifications can be made without depating from the spirit of the present invention. Therefore, it should be clearly understood that the forms of the present invention are illustrative only and are not intended to limit the scope of the present invention.

We claim:

1. A printing paper comprising:

a base paper; and a coating layer formed on said base paper by using a gate roll coating-transcription system, for improving surface strength of the coated paper and releasing-property when two sheets of the coated paper are stacked, said coating layer consisting essentially of at least either a homopolymer polyacrylamide or a nonionic-copolymer polyac rylamide in an amount of from 0.01 g/m$^2$ to 0.2 g/m$^2$ per one side of said base paper, said homopolymer polyacrylamide and said nonionic-copolymer polyacrylamide having a weight average molecular weight ranging from 20,000 to 250,000.

2. A printing paper according to claim 1, wherein said at least either a homopolymer polyacrylamide or a nonionic-copolymer polyacrylamide has a weight average molecular weight ranging from 30,000 to 100,000.

3. A printing paper according to claim 1, wherein said homopolymer polyacrylamide is a homopolymer of acrylamide.

4. A printing paper according to claim 1, wherein said nonionic-copolymer polyacrylamide is a copolymer of acrylamide and melhacrylamide.

5. A printing paper according to claim 1, wherein said base paper has a basis weight less than 46 g/m$^2$.

6. A printing paper according to claim 5, wherein said base paper is newsprint base paper.

7. A printing paper according to claim 1, wherein both sides of said base paper have said coating layers.

8. A printing paper comprising:

a base paper: and a coating layer formed on said base paper by using a gate roll coating-transcription system, for improving surface strength of the coated paper and releasing-property when two sheets of the coated paper are stacked, said coating layer consists essentially of at least either a homopolymer polyacrylamide or a nonionic-copolymer polyacrylamide, and monoalkenyl succinate or its salt containing alkenyl group having 10–16 carbon atoms in an amount of 2% to 5% by weight based on the weight of said at least homopolymer polyacrylamide or nonionic-copolymer polyacrylamide, said homopolymer polyacrylamide and said nonionic-copolymer polyacrylamide having a weight average molecular weight ranging from 20.000 to 250,000.

9. A method for producing a printing paper, comprising:

applying to one side or both sides of a base paper by using a gate roll coating-transcription system, wherein a coating solution consists essentially of at least either a homopolymer polyacrylamide or a nonionic-copolymer polyacrylamide in the range of from 0.01 $g/m^2$ to 0.2 $g/m^2$ per one side of said base paper to form a coating layer on said base paper for improving surface strength of the coated paper and releasing-property when two sheets of the coated paper are stacked, said homopolymer polyacrylamide and said nonionic-copolymer polyacrylamide having a weight average molecular weight ranging from 20,000 to 250,000.

10. A method according to claim 9, wherein said at least either a homopolymer polyacrylamide or a nonionic-copolymer polyacrylamide has a weight average molecular weight ranging from 30,000 to 100,000.

11. A method according to claim 9, wherein said homopolymer polyacrylamide is a homopolymer of acrylamide.

12. A method according to claim 9, wherein said nonionic-copolymer polyacrylamide is a copolymer of acrylamide and methacrylamide.

13. A method according to claim 9, further comprising super-calendaring the coated paper.

14. A method for producing a printing paper, comprising:

applying to one side or both sides of a base paper by using a gate roll coating-transcription system, a coating solution consisting essentially of at least either a homopolymer polyacrylamide or a nonionic-copolymer polyacrylamide, and monoalkenyl succinate or its salt containing alkenyl group having 10–1 6 carbon atoms in an amount of 2% to 5% by weight based on the weight of said at least homopolymer polyacrylamide or nonionic-copolymer polyacrylamide, measured as solid weight portion, to form a coating layer on said base paper for improving surface strength of the coated paper and releasing-property when two sheets of the coated paper are stacked, said homopolymer polyacrylamide and said nonionic-copolymer polyacrylamide having a weight average molecular weight ranging from 20,000 to 250,000.

* * * * *